No. 698,329. Patented Apr. 22, 1902.
G. SENGELAUB.
HARNESS.
(Application filed Apr. 16, 1901.)
(No Model.) 3 Sheets—Sheet 1.

Witnesses
S Brashears
M C Lyddane

Inventor
G. Sengelaub
pr G. Dittmar Atty

THE NORRIS PETERS CO., PHOTO-LITHO., WASHINGTON, D. C.

No. 698,329. Patented Apr. 22, 1902.
G. SENGELAUB.
HARNESS.
(Application filed Apr. 16, 1901.)
(No Model.) 3 Sheets—Sheet 2.

Witnesses
S. Brashears
M. C. Lyddane

Inventor
G. Sengelaub
pr G. Pittman Atty

No. 698,329. Patented Apr. 22, 1902.
G. SENGELAUB.
HARNESS.
(Application filed Apr. 16, 1901.)
(No Model.) 3 Sheets—Sheet 3.

UNITED STATES PATENT OFFICE.

GÜNTHER SENGELAUB, OF BERLIN, GERMANY.

HARNESS.

SPECIFICATION forming part of Letters Patent No. 698,329, dated April 22, 1902.

Application filed April 16, 1901. Serial No. 56,134. (No model.)

*To all whom it may concern:*

Be it known that I, GÜNTHER SENGELAUB, a citizen of Germany, residing at Berlin-Weissensee, Germany, have invented certain new and useful Improvements in Harness; and I do hereby declare the following to be a full, clear, and exact description of the invention, such as will enable others skilled in the art to which it appertains to make and use the same.

Harness of horses or other animals as hitherto known (either collar-harness or breast-harness) are usually faulty in that they do not distribute the pressure evenly over the body of the animal, but very much burden its breast and withers, while its back and sides, which are both especially suited for receiving the pressure, are not burdened. If a wagon-horse, for instance, has a pointed breast, the strain on it by using a harness with a lower breastplate produces inflammation through its chafing. This inflammation affects the circumjacent muscles of the withers and diminishes the efficiency of the animal.

The object of the present invention is to provide a harness which prevents all these faults.

A harness constructed in accordance with this invention is represented by way of example in the accompanying drawings, in which—

Figure 1:
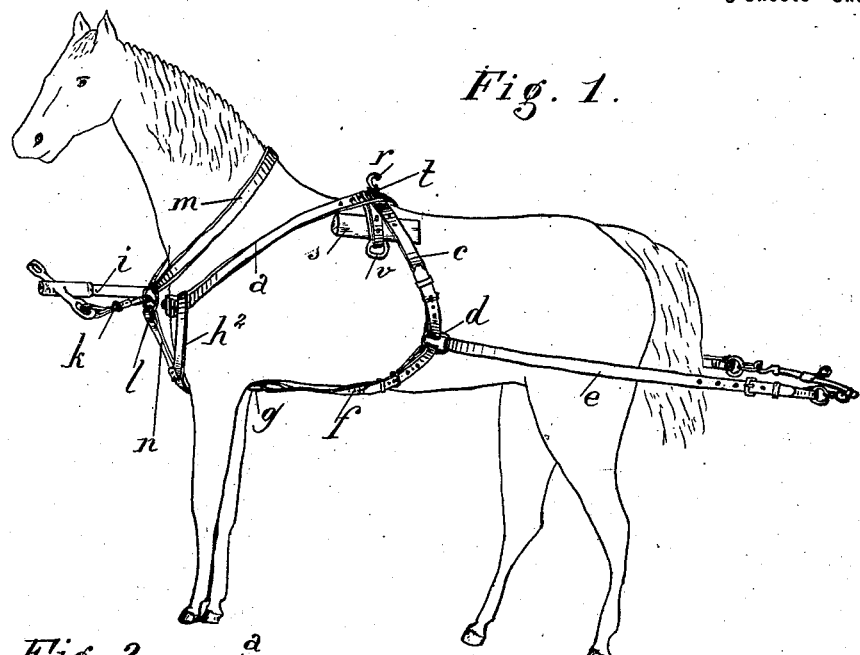
Figure 2:
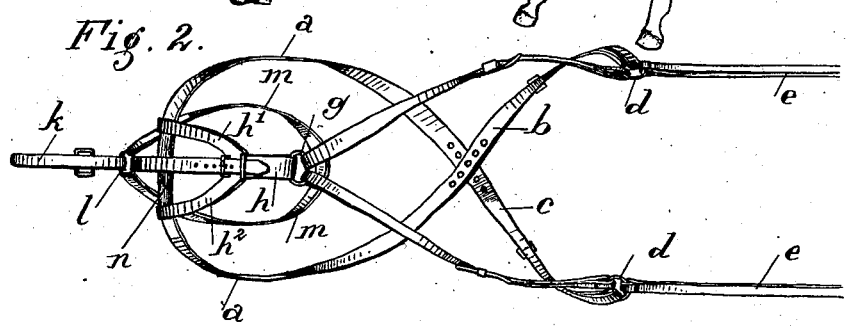
Figure 3:
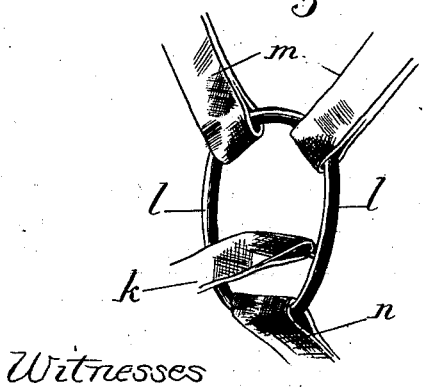
Figure 4:
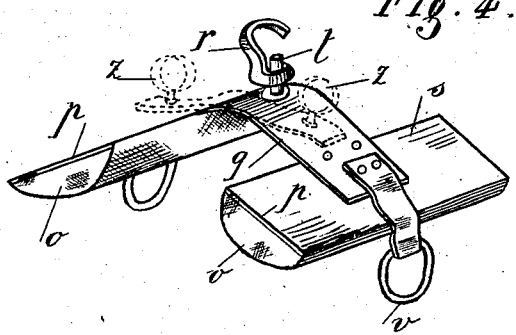
Figure 5:
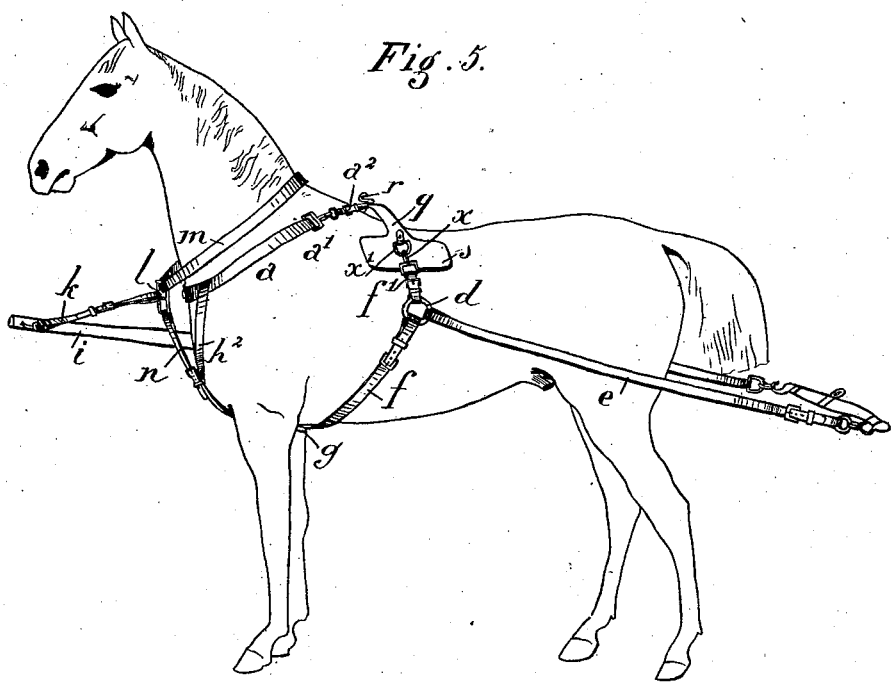
Figure 6:
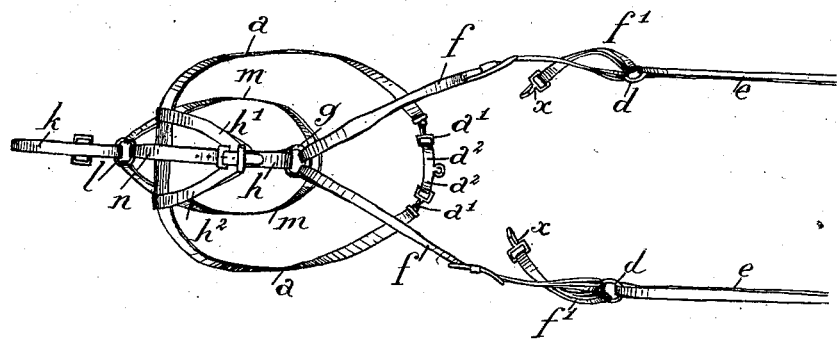
Figure 8:
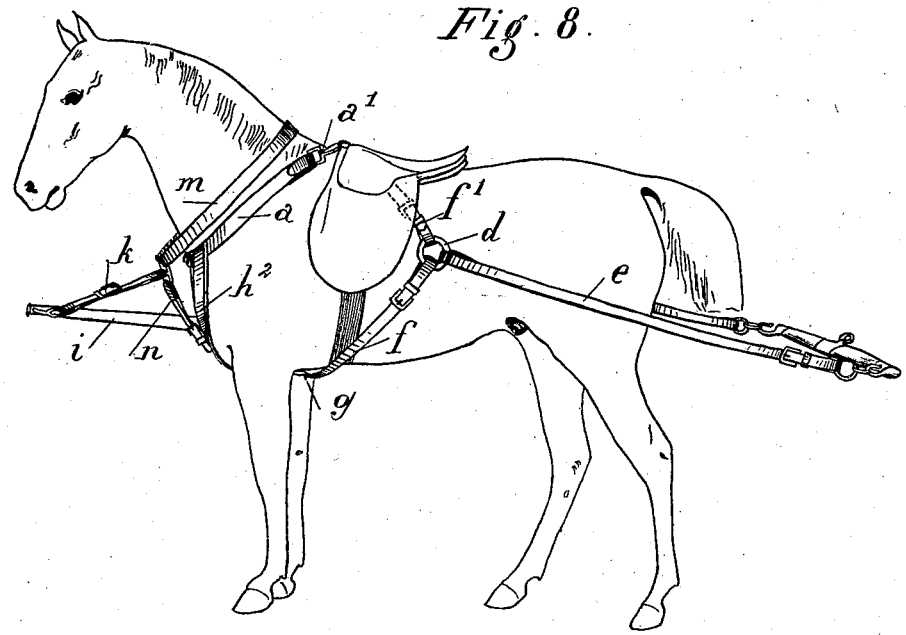
Figure 7:
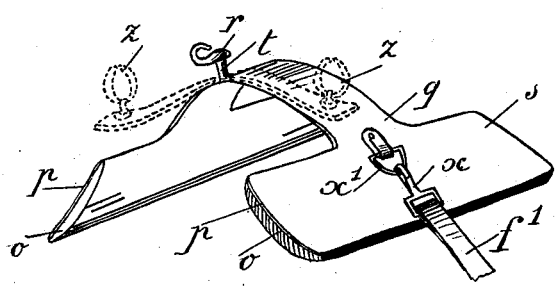

Figure 1 is a side view thereof on the saddle-horse of a pair for two-horse carriages. Fig. 2 is a top view of the harness. Fig. 3 shows the connection of the wither-straps with the shaft. Fig. 4 shows the saddle. Fig. 5 is a side view of another form of a harness put on the saddle-horse of a two-horse carriage. Fig. 6 is a top view of the same. Fig. Fig. 7 shows another form of saddle. Fig. 8 is a side view of a harness on a riding-horse.

On the upper part of the breast is placed the breast-collar $a$, the two ends $b$ and $c$ of which are connected at both sides of the horse by rings $d$ with the trace-straps $e$ after crossing the saddle $s$, which is situated on the back of the horse. From the rings $d$ straps $f$ reach to the ring $g$, situated behind the fore legs of the horse, while the ring $g$ is joined by another strap $h$ with the middle part of the breast-collar $a$. This connecting-strap $h$ does not lead straight to the breast-collar, but is forked between the fore legs of the horse, forming two branches $h'$ and $h^2$, which connect with the breast-collar $a$, thus leaving the lower part of the breast entirely free. The harnessing of the horse to shaft $i$ is effected by the strap $k$, which (by means of the double ring $l$, as shown at Fig. 3,) is connected also with the collar-straps $m$ and with the strap $n$, which latter is buckled on the connecting-strap $h$ at the apex, where the strap $h$ is not yet forked.

The saddle $s$ (represented in Fig. 4) consists of two oblong cushions $o$, fixed to plates $p$, which are connected with a metallic bow $q$. This bow carries a pin $t$, which is provided with a thread and has hook $r$ screwed on it. This pin carries the two ends $b$ and $c$, which are placed crosswise over the saddle-bow. The two ends are punched at several places, Fig. 2, where they cross each other for the purpose of displacement. The saddle is placed with its two cushions $o$ on the commencement of the ribs and on both sides of the backbone, but leaving the latter quite free. Through the bending of the bow $q$ the saddle can be made suitable for any shaped back, while through the removing of the two ends $b$ and $c$ for the breast-collar by putting them on the pin $t$ by means of the different holes the harness is applicable to horses of any form and size. Through the fastening of the ends of the breast-collar, which does not change the position, tying up of the breast and displacement of the trace straps are prevented.

The harness for a double team for two-horse carriages (represented in Fig. 1) can easily be turned into a harness for one horse by means of the straps $v$, attached to the saddle $s$, to which a belly-band may be fixed for the purpose of carrying the cleaves, while the collar-strap $m$ and the joining-strap $k$ and $n$ are not needed. The reins are guided by means of rings $z$, fixed at the bow $q$ of the saddle.

Harness of another form of construction (shown in Figs. 5 and 6) is arranged in such a way that the two ends $b$ and $c$ of the breast-collar $a$ do not pass crosswise over the saddle $s$. For this purpose the two ends of the breast-collar are shortened before crossing the bow of the saddle and are provided with a ring to which a spring-hook $a'$ is fixed, From the ring $d$ small straps $f'$, Figs. 5 and 6, extend to the saddle $s$ and are also provided with spring-hooks X.

The saddle $s$ (shown at Fig. 7) consists of two oblong cushions $o$, fixed to plates $p$, which are connected by a flexible metallic bow $q$ to make the saddle suit for light and heavy horses. The bow $q$ has on its top a pin $t$ and a small hook $r$, to which two small straps $a^2$, provided with rings, are fixed, in which are hung the two ends of the shortened breast-collar by means of the spring-hooks $a'$. Furthermore, at the bow at both sides are fixed movable rings $x'$ for the purpose of hanging in the straps $f'$.

Through the before-described construction and connection of the different parts of the harness the harnessing and unharnessing of the horse are quickly and easily effected.

Harness of a modified form of construction is shown in Fig. 8, arranged in such a way that the ends of the breast-collar $a$ and the straps $f'$ are fixed directly to a riding-saddle of any suitable shape by means of the before-mentioned spring-hooks.

Having thus fully described my invention, what I claim as new, and desire to secure by Letters Patent of the United States, is—

1. The combination in a harness, with the saddle having a bow and a projecting pin, and the traces, of a breast-collar having straps crossed over and fixed on the pin on the bow of the saddle and connecting with the traces, substantially as set forth.

2. The combination in a harness, with the saddle having a bow and a projecting pin, and the traces, of a breast-collar, having straps crossed over and fixed on the pin on the bow of the saddle and connecting with the traces, a forked strap, the body of which passes under the fore legs and the forks extend upward to the breast-collar, and straps connecting the body of the forked strap to the traces, substantially as set forth.

3. The combination in a harness with a saddle, a breast-collar, connected to the saddle, of straps fixed to the traces and fixed to the saddle, and a forked strap connected in the rear with the traces and by its forks to the breast-collar, substantially as described.

In testimony whereof I affix my signature in presence of two witnesses.

GÜNTHER SENGELAUB.

Witnesses:
HENRY HASPER,
WOLDEMAR HAUPT.